United States Patent [19]

Bales et al.

[11] Patent Number: 5,390,241
[45] Date of Patent: Feb. 14, 1995

[54] SHARED LINE APPEARANCE ACROSS A PLURALITY OF SWITCHING SYSTEMS

[75] Inventors: Bruce M. Bales, Louisville; Robert L. Crumpley, Westminster; Stephen M. Thieler, Boulder, all of Colo.

[73] Assignee: AT&T Corp., Murray Hill, N.J.

[21] Appl. No.: 995,418

[22] Filed: Dec. 18, 1992

[51] Int. Cl.⁶ .......................................... H04M 3/42
[52] U.S. Cl. ...................... 379/207; 379/67; 379/93; 379/201; 379/202; 379/210; 379/220; 370/62
[58] Field of Search ............... 379/202, 204, 205, 206, 379/201, 157, 158, 210, 213, 214, 220, 221, 207, 177, 182, 187, 211, 212; 370/62

[56] References Cited

U.S. PATENT DOCUMENTS

| | | | |
|---|---|---|---|
| 4,847,890 | 7/1989 | Solomon et al. | 379/211 X |
| 4,873,717 | 10/1989 | Davidson et al. | 379/210 |
| 4,878,216 | 10/1989 | Yunoki | 370/60 |
| 4,885,769 | 12/1989 | Beierle | 379/214 |
| 4,896,319 | 1/1990 | Lidinsky et al. | 370/60 |
| 4,899,333 | 2/1990 | Roediger | 370/60 |
| 4,988,209 | 1/1991 | Davidson et al. | 370/58.2 |
| 5,001,710 | 3/1991 | Gawrys et al. | 370/110.1 |
| 5,012,512 | 4/1991 | Basso et al. | 379/218 |
| 5,014,266 | 5/1991 | Bales et al. | 370/60.1 |
| 5,016,243 | 5/1991 | Fite, Jr. | 370/16 |
| 5,023,780 | 6/1991 | Brearley | 364/200 |
| 5,023,868 | 6/1991 | Davidson et al. | 370/62 |
| 5,036,535 | 7/1991 | Gechter et al. | 379/210 |
| 5,051,992 | 9/1991 | Taniguchi et al. | 370/110.1 |
| 5,058,152 | 10/1991 | Solomon et al. | 379/211 X |
| 5,062,103 | 10/1991 | Davidson et al. | 370/58.1 |
| 5,206,901 | 4/1993 | Harlow et al. | 379/211 |
| 5,247,571 | 9/1993 | Kay et al. | 379/207 |
| 5,253,288 | 10/1993 | Frey et al. | 379/221 |

Primary Examiner—James L. Dwyer
Assistant Examiner—Daniel S. Hunter
Attorney, Agent, or Firm—John C. Moran

[57] ABSTRACT

Allowing a shared line appearance feature to be implemented on a plurality of telephone station sets which are connected to different telecommunication switching systems. The telecommunication switching systems can be interconnected to each other via the public telephone network utilizing standard telecommunication links. A software application program provides a termination point for a directory number that is associated with a shared line appearance. The software application program receives all incoming calls directed to the directory number and determines the operations that should be performed with respect to the telephone station sets terminating the shared line appearance. The software application program directs the incoming calls to the telephone stations sets regardless to which telecommunication system each of the telephone station sets is interconnected. An outgoing call from one of the telephone station sets is switched to the software application program which then switches the outgoing call to the destination telephone terminal as if the outgoing call had originated at the location of the software application program. With respect to the outgoing call, the software application program also transmits messages to the other telephone station sets terminating the shared line appearance, so that those telephone station sets can indicate that the shared line appearance is busy.

31 Claims, 9 Drawing Sheets

NODE HIERARCHY

DIRECTORY DIALING PLAN HIERARCHY

SECONDARY DIALING PLAN HIERARCHY

FIG. 7

DIALING PLAN TABLE 708 NODE 102

| TEL # | NODE # | OWNERSHIP | STATUS |
|---|---|---|---|
| 1XXX | 101 | 2 | 1 |
| 2XXX | 104 | 2 | 1 |
| 3XXX | 106 | 2 | 1 |
| XXXX | NMS | 1 | 1 |

LEVEL 5 ROUTING TABLE 706-NODE 102

| TEL # | NODE |
|---|---|
| 1XXX | 101 |
| 2XXX | 104 |
| 3XXX | 106 |
| XXXX | 102 |

LEVEL 4 ROUTING TABLE 707 NODE 102

| NODE # | LDC OF | # OF HOPS |
|---|---|---|
| 101 | 150 | 1 |
| 104 | 150 | 2 |
| 106 | 160 | 1 |

DIALING PLAN TABLE 711 NODE 101

| TEL # | NODE # | OWNERSHIP | STATUS |
|---|---|---|---|
| 1XXX | 102 | 1 | 1 |

LEVEL 5 ROUTING TABLE 709-NODE 101

| TEL # | NODE |
|---|---|
| 1XXX | 101 |
| XXXX | 102 |

LEVEL 4 ROUTING TABLE 710 NODE 101

| NODE # | LDC OF | # OF HOPS |
|---|---|---|
| 101 | 150 | 1 |
| 104 | 155 | 1 |
| 105 | 151 | 1 |

DIALING PLAN TABLE 704 NODE 104

| TEL # | NODE # | OWNERSHIP | STATUS |
|---|---|---|---|
| 20XX | 109 | 2 | 1 |
| 2XXX | 102 | 2 | 1 |

LEVEL 5 ROUTING TABLE 713-NODE 104

| TEL # | NODE |
|---|---|
| 20XX | 109 |
| 2XXX | 104 |
| XXXX | 102 |

LEVEL 4 ROUTING TABLE 712 NODE 104

| NODE # | LDC OF | # OF HOPS |
|---|---|---|
| 101 | 155 | 1 |
| 102 | 155 | 2 |
| 109 | 158 | 1 |

DIALING PLAN TABLE 715 NODE 109

| TEL # | NODE # | OWNERSHIP | STATUS |
|---|---|---|---|
| 20XX | 104 | 2 | 1 |

LEVEL 5 ROUTING TABLE 716-NODE 109

| TEL # | NODE |
|---|---|
| 20XX | 109 |
| 2XXX | 104 |

LEVEL 4 ROUTING TABLE 717 NODE 109

| NODE # | LDC OF | # OF HOPS |
|---|---|---|
| 104 | 158 | 1 |

FIG. 8

DIRECTORY DIALING PLAN TABLE 801 FOR NODE 106

| TEL # | NODE # | OWNERSHIP | STATUS |
|---|---|---|---|
| 3XXX | 102 | 1 | 1 |

LEVEL 5 ROUTING TABLE 802 FOR NODE 106

| TEL # | NODE |
|---|---|
| 1XXX | 101 |
| 3XXX | 106 |
| XXXX | 102 |

LEVEL 4 ROUTING TABLE 803 FOR NODE 106

| NODE # | LDC OF | # OF HOPS |
|---|---|---|
| 102 | 161 | 1 |
| 101 | 161 | 2 |

DIRECTORY DIALING PLAN TABLE 804 FOR NODE 105

| TEL # | NODE # | OWNERSHIP | STATUS |
|---|---|---|---|
| 10XX | 101 | 2 | 1 |

LEVEL 5 ROUTING TABLE 805 FOR NODE 105

| TEL # | NODE |
|---|---|
| 10XX | 105 |
| 1XXX | 101 |
| XXXX | 102 |

LEVEL 4 ROUTING TABLE 806 FOR NODE 105

| NODE # | LDC OF | # OF HOPS |
|---|---|---|
| 102 | 165 | 1 |
| 101 | 151 | 1 |

FIG. 10

SECONDARY DIALING PLAN TABLE 1001 FOR NODE 101

| TEL # | NODE # | OWNERSHIP | STATUS |
|---|---|---|---|
| 1010 S12XX | 104 | 1 | 1 |
| S1102 | 105 | 1 | 1 |

LEVEL 5 ROUTING TABLE 1002 FOR NODE 101

| TEL # | NODE |
|---|---|
| S12XX | 101 |
| 1011 S1102 | 101 |
| 1013 S11XX | 105 |
| 1012 S1XXX | 104 |

LEVEL 4 ROUTING TABLE 1003 FOR NODE 101

| NODE # | LDC OF | # OF HOPS |
|---|---|---|
| 102 | 150 | 1 |
| 104 | 155 | 1 |
| 105 | 151 | 1 |

SECONDARY DIALING PLAN TABLE 1004 FOR NODE 109

| TEL # | NODE # | OWNERSHIP | STATUS |
|---|---|---|---|
| S10XX | 104 | 1 | 1 |

LEVEL 5 ROUTING TABLE 1005 FOR NODE 109

| TEL # | NODE |
|---|---|
| S10XX | 109 |
| S1XXX | 104 |

LEVEL 4 ROUTING TABLE 1006 FOR NODE 109

| NODE # | LDC OF | # OF HOPS |
|---|---|---|
| 104 | 158 | 1 |

FIG. 9

SECONDARY DIALING PLAN TABLE 901 FOR NODE 102

| TEL # | NODE # | OWNERSHIP | STATUS |
|---|---|---|---|
| S1XXX | 104 | 2 | 1 |
| S2XXX | 106 | 2 | 1 |
| SXXXX | NMS | 1 | 1 |

LEVEL 5 ROUTING TABLE 902 FOR NODE 102

| TEL # | NODE |
|---|---|
| S1XXX | 104 |
| S2XXX | 106 |

LEVEL 4 ROUTING TABLE 903 FOR NODE 102

| NODE # | LDC OF | # OF HOPS |
|---|---|---|
| 101 | 150 | 1 |
| 106 | 160 | 1 |
| 104 | 150 | 2 |

SECONDARY DIALING PLAN TABLE 904 FOR NODE 105

| TEL # | NODE # | OWNERSHIP | STATUS |
|---|---|---|---|
| S11XX | 104 | 1 | 1 |
| S1102 | 101 | 2 | 1 |
| S1103 | 106 | 2 | 1 |

915

LEVEL 5 ROUTING TABLE 905 FOR NODE 105

| TEL # | NODE |
|---|---|
| S11XX | 105 |
| S1XXX | 104 |
| S1102 | 101 |
| S1103 | 106 |

916

LEVEL 4 ROUTING TABLE 906 FOR NODE 105

| NODE # | LDC OF | # OF HOPS |
|---|---|---|
| 101 | 151 | 1 |
| 101 | 165 | 2 |
| 104 | 151 | 2 |
| 106 | 165 | 2 |

SECONDARY DIALING PLAN TABLE 907 FOR NODE 104

| TEL # | NODE # | OWNERSHIP | STATUS |
|---|---|---|---|
| S10XX | 109 | 2 | 1 |
| S11XX | 105 | 2 | 1 |
| S12XX | 101 | 2 | 1 |
| SXXXX | 102 | 1 | 1 |

LEVEL 5 ROUTING TABLE 908 FOR NODE 104

| TEL # | NODE |
|---|---|
| S10XX | 109 |
| S11XX | 105 |
| S12XX | 101 |
| S1XXX | 104 |

917

LEVEL 4 ROUTING TABLE 909 FOR NODE 104

| NODE # | LDC OF | # OF HOPS |
|---|---|---|
| 101 | 155 | 1 |
| 102 | 155 | 2 |
| 105 | 155 | 2 |
| 109 | 158 | 1 |

918

SECONDARY DIALING PLAN TABLE 910 FOR NODE 106

| TEL # | NODE # | OWNERSHIP | STATUS |
|---|---|---|---|
| S2XXX | 102 | 1 | 1 |
| S1103 | 105 | 1 | 1 |

LEVEL 5 ROUTING TABLE 911 FOR NODE 106

| TEL # | NODE |
|---|---|
| S11XX | 105 |
| S1XXX | 104 |
| S2XXX | 106 |
| SXXXX | 102 |

LEVEL 4 ROUTING TABLE 912 FOR NODE 106

| NODE # | LDC OF | # OF HOPS |
|---|---|---|
| 101 | 161 | 2 |
| 102 | 161 | 1 |
| 104 | 161 | 3 |
| 105 | 161 | 1 |

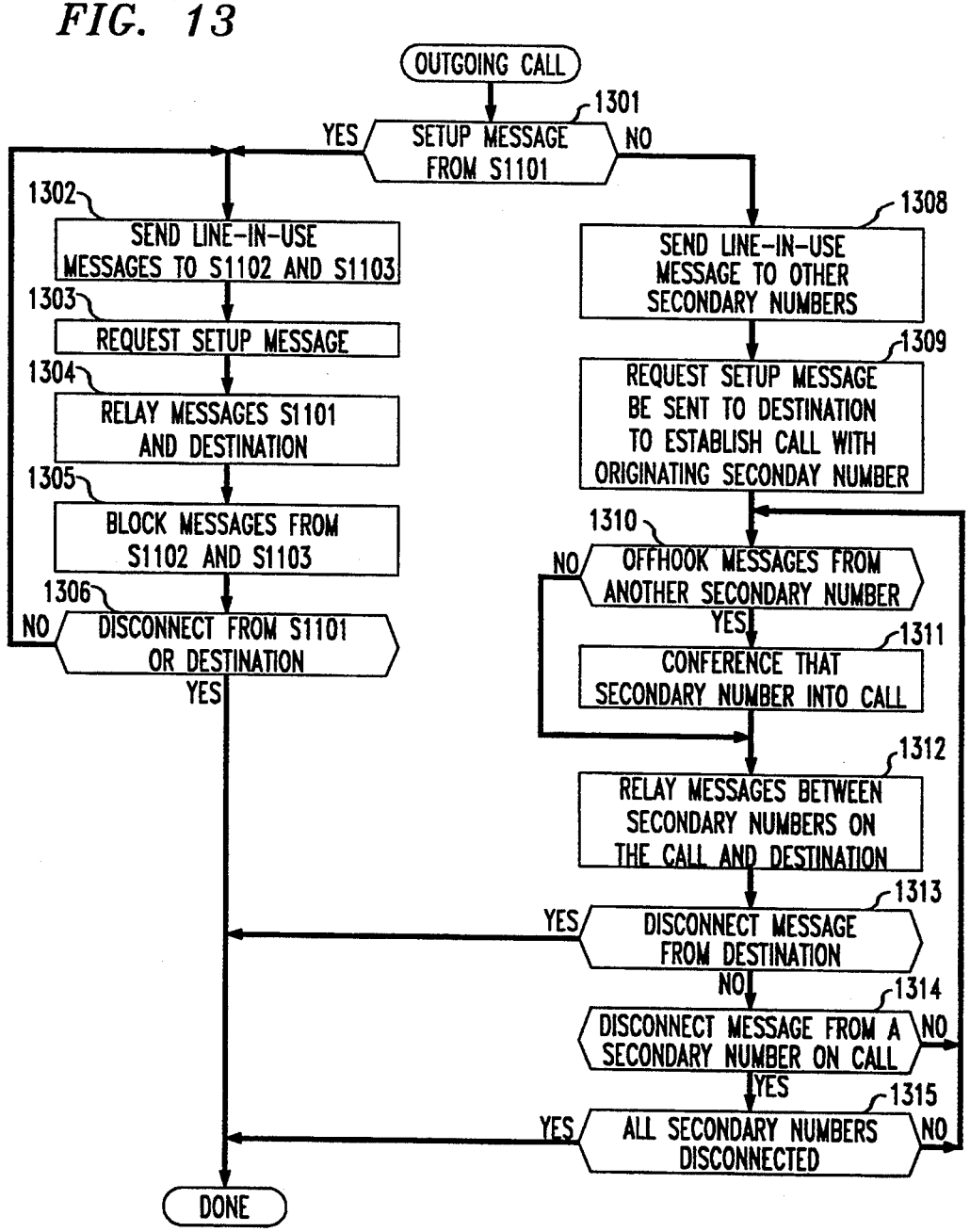

SHARED LINE APPEARANCE ACROSS A PLURALITY OF SWITCHING SYSTEMS

TECHNICAL FIELD

This invention relates to telecommunication switching and, in particular, to the provision of a shared line appearance feature for a plurality of telephone station sets connected to a plurality of telecommunication switching systems.

BACKGROUND OF THE INVENTION

A shared line appearance feature allows a number of stations to share a common directory number on a line appearance of each of the telephone station sets. If a caller places a call to the directory telephone number, any one of the telephone station sets having a line appearance for that telephone number can answer the telephone call. After one of the telephone station sets has answered the call, another telephone station set can be added to the telephone call simply by the other station set picking up on the line appearance. Similar operations are performed with respect to one of the telephone station sets placing an outgoing call. The state of the line appearance is displayed on all telephone station sets terminating that telephone directory number. The shared line appearance feature has proven particularly useful in the business environment.

Whereas prior art telecommunication switching systems have offered the shared line appearance feature, a problem in the prior art has been that all of the telephone stations sets involved in the shared line appearance had to be directly connected to one telecommunication system. This restriction has proven to be a problem with respect to private networks of business telecommunication systems (also referred to as PBXs) and the Centrex service.

SUMMARY OF THE INVENTION

The foregoing problem is solved and a technical advance is achieved by an apparatus and method that allows a shared line appearance feature to be implemented on a plurality of telephone station sets which are connected to different telecommunication switching systems. Advantageously, the telecommunication switching systems can be interconnected to each other via the public telephone network utilizing standard telecommunication links. A software application program terminates a directory number associated with a shared line appearance and receives all incoming calls directed to the directory number and determines the operations that should be performed with respect to the telephone station sets terminating the shared line appearance. The software application program directs the incoming calls to the telephone stations sets regardless to which telecommunication system each of the telephone station sets is interconnected. An outgoing call from one of the telephone station sets is switched to the software application program which then switches the outgoing call to the destination telephone terminal as if the outgoing call had originated at the location of the software application program. Also, the originating directory number used in placing the outgoing call is the directory number associated with the shared line appearance. With respect to the outgoing call, the software application program also transmits messages to the other telephone station sets terminating the shared line appearance, so that those telephone station sets can indicate that the shared line appearance is busy.

Advantageously, the apparatus and method utilizes two dialing number plans: the directory number plan, which consists of standard telephone numbers, and a secondary dialing plan. The secondary dialing plan is utilized by the software application program to direct and receive calls from the telephone station sets terminating the shared line appearance.

BRIEF DESCRIPTION OF THE DRAWING

FIGS. 7 through 10 illustrate the dialing plan and routing tables utilized by the telecommunication switching system of FIG. 1;

FIG. 11 illustrates a directory number management table; and

FIGS. 12 and 13 illustrate, in flow chart form, the operations performed by a directory number application program.

DETAILED DESCRIPTION

Figure 1:
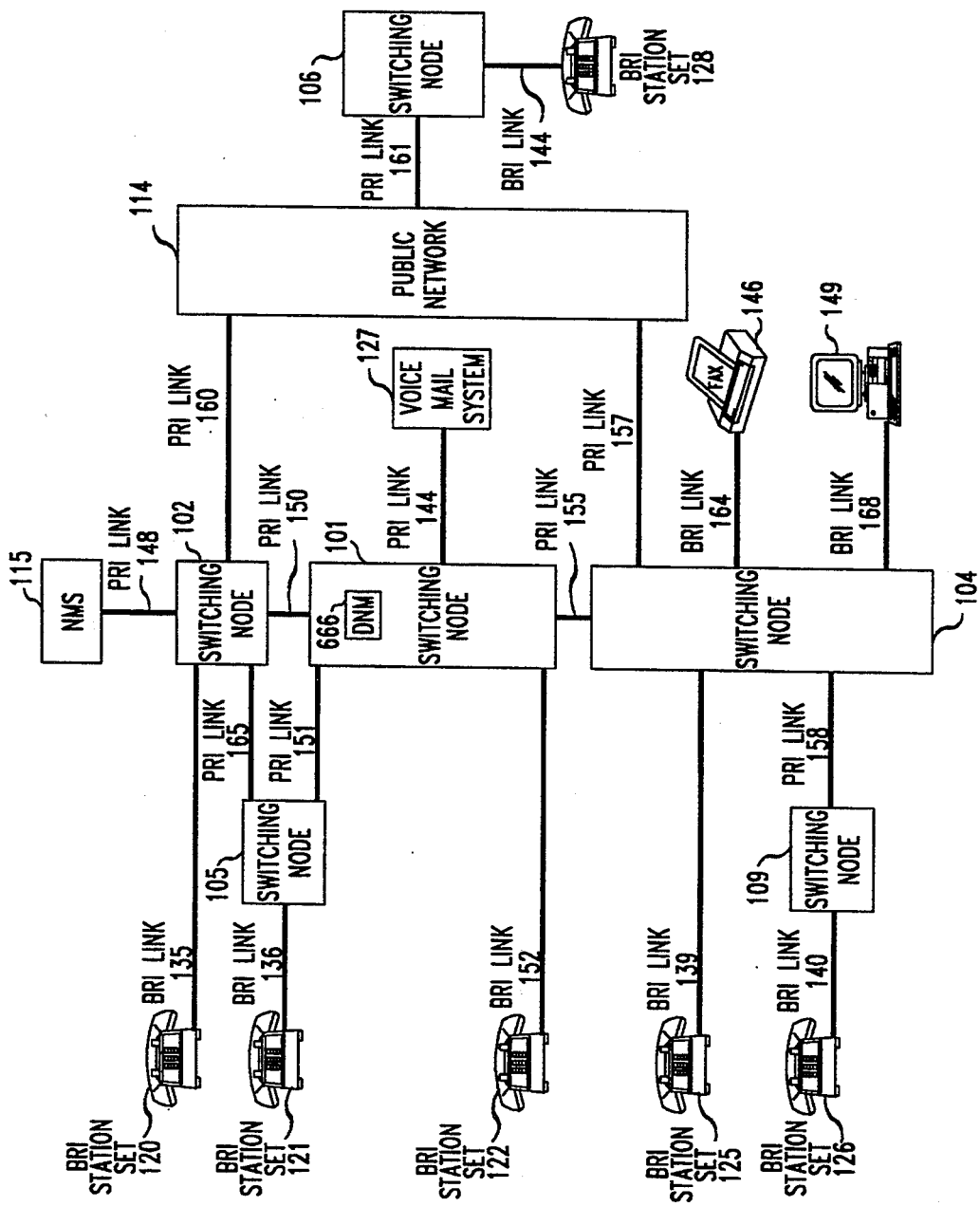
FIG. 1 illustrates, in block diagram form, a telecommunication switching system embodying the inventive concept.

FIG. 1 shows a telecommunication switching system having a plurality of switching nodes 101 through 109 with a network management system (NMS) 115. Each of the switching nodes 101 through 109 provides communication for a plurality of telecommunication terminals such as BRI station sets 120 through(130 and such functions as an independent telecommunication system. Advantageously, the switching nodes of FIG. 1 function as an integrated system to provide telecommunication services such as those provided by an individual or a network of AT&T Definity Generic II communication systems. Switching node 106 is interconnected to the other switching nodes via public network 114 and is providing telecommunication services to a group of people who are geographically remote from the people served by the other switching nodes. In accordance with the invention, the telecommunication system has a directory (primary) dialing plan and a secondary dialing plan.

Further, in accordance with the invention, a group of stations share a line appearance which has a directory telephone number. All calls to that directory telephone number are directed to a directory number management application (DNM) such as DNM 666 of FIG. 1. DNM 666 is responsive to incoming calls to route those calls to the station sets terminating the shared line appearance. The routing of a call from DNM 666 to the terminating station sets is done using the secondary dialing plan. Each station set that terminates a shared line appearance directory number has a unique secondary number. All outgoing calls from a terminating station set are first directed to DNM 666 utilizing the directory dialing plan, and, then, DNM 666 routes the call to the destination telephone terminal utilizing the directory dialing plan. Since both incoming and outgoing calls are routed through DNM 666, this directory number management application controls the feature interaction among the station sets that terminate the shared line appearance number. With respect to an outgoing call originated by one of the terminating station sets, DNM 666 is responsive to the outgoing call from one of the terminating station sets to originate a call to the destination. The outgoing call originates from DNM 666. The destination telephone terminal displays that the call was received from the directory telephone number associated with the shared line appearance rather than, showing that it originated from the secondary number assigned to the originating telephone station set of the shared line appearance.

Unlike a prior art system of switching nodes such as a network of Definity Generic II communication systems, a switching node of FIG. 1 has no predefined stored information defining how this system is configured before initialization, what telecommunication links are terminated on which nodes, what interfaces are utilized to terminate those links, the physical configuration of the switching nodes, and the type and features of the station sets. Further, there is no predefined information setting forth the two dialing plans which are utilized to identify the telecommunication terminal equipment connected to each of the switching nodes. Finally, each switching node has no predefined knowledge of what telecommunication terminals are connected to it.

Figure 2:
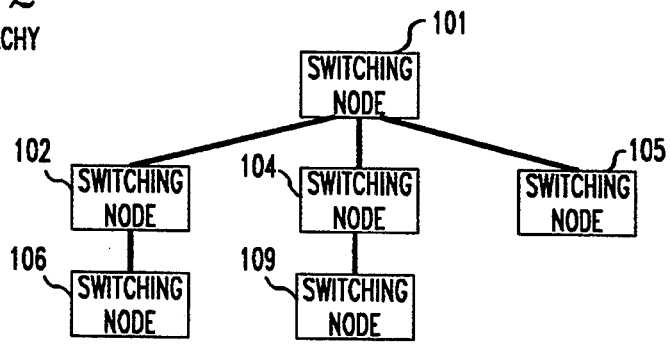
FIG. 2 illustrates the node hierarchy of the switching nodes of FIG. 1.
Figure 3:
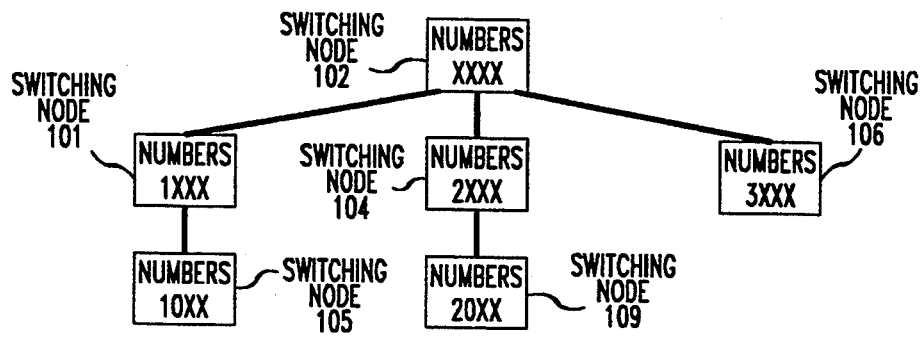
FIG. 3 illustrates the directory dialing plan hierarchy of the switching nodes of FIG. 1.
Figure 4:
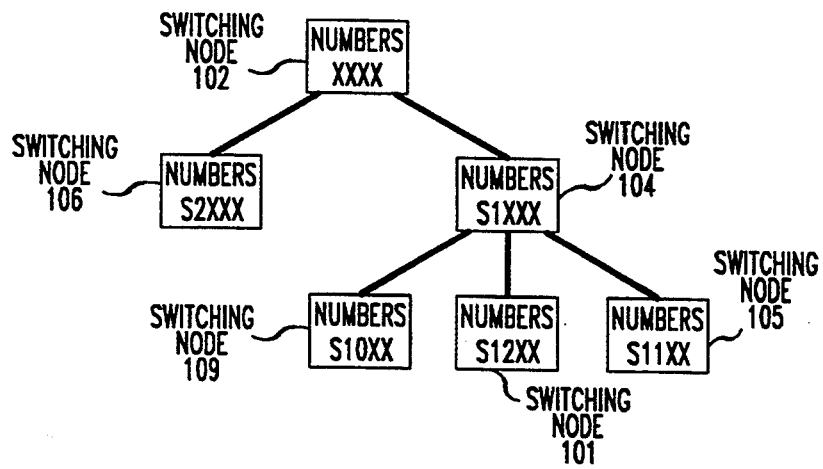
FIG. 4 illustrates the secondary dialing plan hierarchy of the switching nodes of FIG. 1.

Each switching node determines the above information upon the entire system being initialized or an individual switching node being initialized or the initialization of a new telephone communication terminal. In addition, an individual switching node begins to determine new paths through the system upon an individual telecommunication link becoming active after the switching node has been initialized. To obtain this information, each switching node as it becomes active must perform the following functions: (1) establish its own internal configuration, (2) identify and initialize interfaces, (3) establish its position in the switching node hierarchy, (4) obtain ownership for its portion of the primary dialing plan, and (5) learn how to route calls through the system. In addition, network management system (NMS) 115 must establish a call to each switching node in order to distribute the primary and secondary dialing plans among the switching nodes and to provide other management functions. Each of these functions is described in the U.S. patent application Ser. No. of B. M. Bales, et. al. "Automatic Initialization of a Distributed Telecommunication System", U.S. patent application Ser. No. 07/816360, filed on Dec. 30, 1991, assigned to the same assignee as the present application, and hereby incorporated by reference. FIG. 2 illustrates the switching node hierarchy, FIG. 3 illustrates the directory/primary dialing plan hierarchy, and FIG. 4 illustrates the secondary dialing plan hierarchy.

Consider now in general terms those operations that must be performed in order to implement the present invention during initialization. These functions are: (1) activation of the directory number manager, (2) identifying within the directory dialing plan the directory number used by the directory number manager, (3) obtaining ownership of a portion of the secondary dialing plan by each switching node, (4) initializing and identifying telecommunication terminals using a shared number, (5) identifying the telecommunication terminals utilizing the secondary dialing plan to their associated directory number managers, and (6) learning how to route calls through the system utilizing the secondary dialing plan and routing information associated with the switching node and directory dialing plan hierarchies. To illustrate how these functions are performed, consider the following example where BRI station sets 121,122, and 128 of FIG. 1 share a directory number whose directory number manager (directory number manager 666) is executing on switching node 101.

The first function (activation of the directory number manager by NMS 115) accomplished as follows. During the initialization of the system illustrated in FIG. 1, NMS 115 learned a route to switching node 101 in order to distribute the directory dialing plan. NMS 115 now transmits control information to switching node 101 over the same route activating the execution of directory number manager 666.

In order to accomplish the second function (identifying the directory number used by the directory number management application to the directory dialing plan), directory number manager 666 executing on node 101 informs the dialing plan application of node 101 that the directory number management application will be using the number 1101. Since switching node 101 owns the block of number 11XX as illustrated in FIG. 3, the dialing plan application records that this number is associated with directory number manager 666.

Consider now how the third function (obtaining ownership of a portion of the secondary dialing plan by a switching node). As for the directory dialing plan, NMS 115 must first inform each switching node of its portion of the secondary dialing plan. Upon being notified that it should own a certain block of secondary numbers, each switching node finds its superior switching node in the dialing plan hierarchy by placing a call to its superior switching node and asks permission from the superior switching node to own that block of numbers. For example, switching node 104 is informed by NMS 115 that switching node 104 is to own the block of numbers "S1XXX" and is also informed that switching node 102 is higher in the secondary dialing plan hierarchy as illustrated in FIG. 4. During establishment of switching node 104's position in the directory dialing plan hierarchy and in the switching node hierarchy, switching node 104 gained sufficient information to route a call to switching node 102. By placing a call, the dialing plan application of switching node 104 requests from the dialing plan application of switching node 102 permission to own the block of secondary numbers "S1XXX". Similarly, the other switching nodes in FIG. 1 obtain permission to own blocks of the secondary dialing plan.

The fourth function that is to be performed is the initialization and identification of the telecommunication terminals using a shared number. In the present example, BRI station sets 121,122, and 128 are sharing the directory number which is controlled by directory number manager 666 on switching node 101. The fourth function is an extension of the function identified as function (2) as set forth in the above incorporated application. With respect to BRI station set 121, BRI station set 121 comes up in the normal manner and establishes with switching node 105 low level ISDN communication over BRI link 136. BRI station set 121 is communicating with a terminal management application in switching node 105. BRI station set 121 identifies itself to the terminal management application during the TEI assignment procedure. As pan of the procedure, the terminal management application requests the service profile ID (SPID) information from BRI station set 121. The SPID information identifies the terminal service profile (TSP) which defines the directory number plus features of the station set. In the case of a station set which has a solo directory number, the SPID information must be verified with the dialing plan application of the node with respect to the assignment of the directory number. In turn, the terminal management application must receive the service profile information from the system network management application in NMS 115. When a station set is sharing a directory number, the service profile information identifies that there is a shared directory number and defines that number. In addition, the terminal service profile information provides the secondary number which is being used by this station set. In the present example, BRI station set 121 is assigned the secondary number of "S1101". The terminal management application running in switching node 105, to which BRI station set 121 is connected, requests that the dialing plan application in switching node 105 verify that the secondary number of "S1101" can be used. From FIG. 4 it can be seen that switching node 105 owns the block of numbers "S11XX". Hence, the terminal management application receives permission for BRI station set 121 to utilize this secondary number.

To perform the fifth function (identifying the telecommunication terminals having a shared directory number to their directory number management application), the terminal management application controlling BRI station set 121 must identify this station set to directory number management application 666 in switching node 101, which is controlling the shared number. This is accomplished by the terminal management application placing a call to the directory number management application. This call is placed utilizing the shared directory number, "1101", and is easily routed to switching node 101. From FIG. 3, it is seen that switching node 105 is aware of the numbers controlled by switching node 101; and from the node hierarchy illustrated in FIG. 2, switching node 105 realizes that it is directly attached to switching node 101. Once the call has been established, the terminal management application transmits the secondary number of BRI station set 121 along with information defining the route to directory number management application 666. Directory number management application 666 records the fact that BRI station set 121 is sharing directory number 1101. Also, lower software layers in switching node 101 record the route information.

The sixth function (learning how to route using the secondary dialing plan) was accomplished by the fifth function. During performance of the fifth function, each telecommunication terminal sharing a directory number places a call via the terminal management application to the directory number management application and includes information on how to reach that terminal management application via the secondary dialing plan. There is never a problem for the directory number management application in routing information back to the terminal management application since that route is defined by the initial call from the terminal management application.

Consider now how BRI station set 122 performs the above six functions. BRI station set 122 performs the TEI assignment procedure in the same manner as BRI station set 121. A terminal management application in switching node 101 is responsive to the SPID information from BRI station set 122 to obtain the terminal service profile information. From this information, the terminal management application identifies the fact that BRI station set 122 is sharing directory number "1101" controlled by directory number management application 666 in switching node 101. The terminal management application then informs directory number application 666 of the existence of BRI station set 122 and of how to route to this particular terminal application program. In addition, the terminal management application provides to directory number management application 666 the secondary number of BRI station set 122 which is "S1102". Also, the terminal management application requests that the dialing plan application of switching node 101 receive permission to utilize the secondary number "S1102". The dialing plan application requests from the dialing plan application of switching node 105 permission to "host" the number "S1102". Since, as can be observed from FIG. 4, switching node 105 owns the block of secondary numbers "S11XX", the process of requesting permission to host a number allows the dialing plan application of switching node 101 to utilize this number. The previously incorporated patent application defines the process of hosting a number.

Consider now how BRI station set 128 performs the above six functions. The TEI assignment procedure is performed with switching node 106. A terminal management application in switching node 106 is responsive to this procedure to obtain the terminal service profile which includes the shared directory number, the secondary telephone number, and the features of BRI station set 128. The terminal management application in switching node 106 then places a call to directory number management application 666 in switching node 101. This call is routed utilizing the directory dialing plan, which is well established at this point in time. The terminal management application informs directory number management application 666 of the existence of BRI station set 128 and that its secondary number is "S1103". The terminal management application in switching node 106 requests that the dialing plan application of switching node 106 request permission from the dialing plan application of switching node 101 to host the secondary number of BRI station set 128, since that secondary number is in a block owned by switching node 101. The operation of these four features is as before since directory number management application 666 simply routes the calls and messages to BRI station set 128 via switching node 106.

In conclusion, within the present example, BRI station sets 121,122, and 128, which are sharing shared directory number "1101", have identified themselves to directory number management application 666, which is controlling that directory number. In addition, directory number management application 666 has information on how to route calls to these BRI station sets utilizing secondary numbers.

Consider now the implementation of the shared line appearance feature in accordance with the invention. The shared line appearance feature is explained by way of an example with respect to FIG. 1. This example assumes that for incoming calls any of the station sets can answer the call and that any one of the remaining station sets can become part of the call simply by going off hook. For outgoing calls, if the outgoing call is initially placed by BRI station set 122 or 128, any one of the remaining station sets can enter the outgoing call by simply going off hook. However, if the outgoing call is placed by BRI station set 121, BRI station sets 122 and 128 are excluded from the call, but do receive information indicating that the shared call appearance line is busy. An incoming call to directory number "1101" terminates on DNM 666, which is executing in switching node 101. DNM 666 is responsive to the setup message of the incoming call to send setup messages to BRI station sets 121,122, and 128 utilizing the secondary dialing plan. DNM 666 is responsive to an alerting message from any of the three BRI station sets to transmit back to BRI station set 126 an alerting message. If none of the BRI station sets of the shared line appearance answer the call within the specified amount of time, the call is sent to call coverage, which in this example consists only of voice mail system 127. Voice mail system 127 assumes that the call is from directory number "1101", and the user of BRI station set 126 is given the opportunity of leaving a voice message. This voice message can be retrieved by a user using any one of BRI station sets 121,122, or 128 (the shared line appearance BRI station sets). If one of the shared line appearance BRI station sets responds with a connect message, DNM 666 transmits line-in-use messages to the other two BRI station sets and requests that switching node 101 interconnect BRI station set 126 with the shared line appearance BRI station set that responded with the connect message. Assume that BRI station set 121 answered the incoming call. BRI station set 122 or 128 can enter the established call by simply going off hook. DNM 666 is responsive to an off hook message from either of these BRI station sets to conference that station set into the incoming call. The incoming call is dropped if BRI station set 126 or the last shared line appearance station set on the incoming call transmits a disconnect message to DNM 666.

Assume that the user of BRI station set 121 places a call to BRI station set 126. First, BRI station set 121 places a call to DNM 666 utilizing the directory number dialing plan and includes its secondary number. DNM 666 is responsive to the call from BRI station set 121 to send line-in-use messages to BRI station sets 122 and 128 utilizing the secondary dialing plan. DNM 666 then transmits a setup message to BRI station set 126. When a connect message is received from BRI station set 126, DNM 666 interconnects the call from BRI station set 121 to the call from BRI station set 126. Switching node 666 then relays messages back and forth between BRI station sets 121 and 126 until one of these station sets disconnects from the call. Note, since BRI station set 121 has exclusion preference on outgoing calls, DNM 666 blocks BRI station sets 122 or 128 from entering this outgoing call. An outgoing call from either BRI station set 122 or 128 is similar to an outgoing call from BRI station set 121 with the exception that the other two BRI station sets can enter the call at any time simply by going off hook.

SOFTWARE ARCHITECTURE

Figure 5:
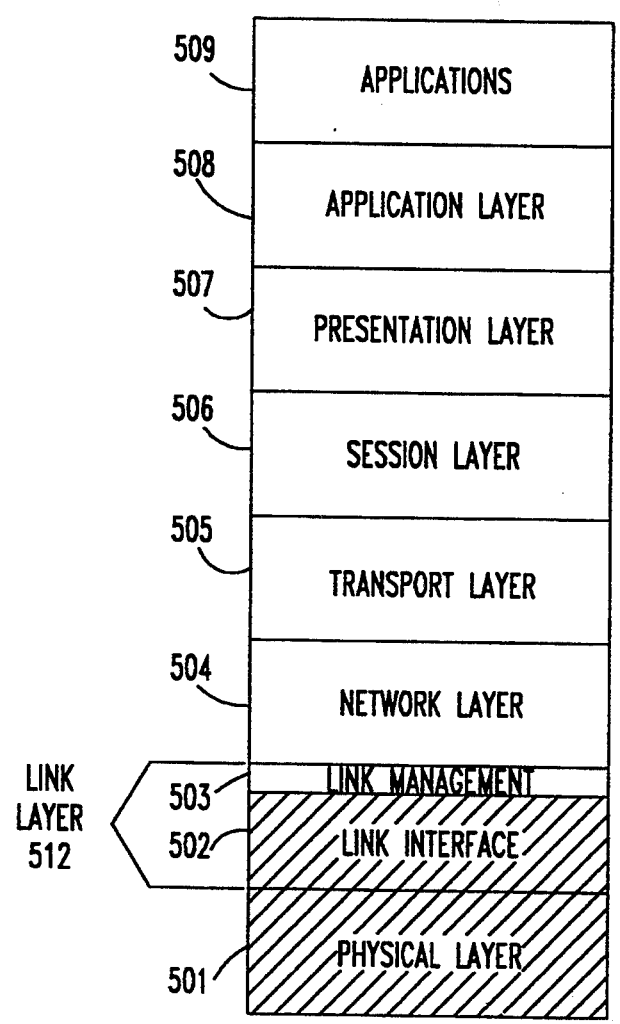
FIG. 5 illustrates the software architecture implemented in each of the switching nodes.

FIG. 5 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 501 is to terminate physical links. Specifically, physical layer 501 is responsible for maintaining physical channels and for controlling physical subchannels thereon. Physical layer 501 comprises a software portion and physical interfaces. Further, the software portion of physical layer 501 is responsible for the direct control of the physical interfaces to which physical links communicating PRI and BRI information terminate. Physical layer 501 presents to link layer 512 physical subchannels and physical channels as entities controllable by link layer 512.

The primary function of link layer 512 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 512 and physical layer 501. (An example of this type of protocol is the LAPD packet protocol used in ISDN Q.921. In the ISDN standard, link layer 512 terminates the LAPD protocol.) Link layer 512 can support multiple protocols so that the upper layers are uneffected by the different protocols being utilized. Further, link layer 512 allows higher software layers to control physical layer 501 in an abstract manner.

As seen in FIG. 5, link layer 512 is divided into link interface 502 and link management layer 503. The reason for this division is set forth herein below. It will be helpful at this point to discuss the communication of ISDN signals over a D channel to help readers, for example, who have only a rudimentary knowledge of the communication of ISDN signals over a D channel. At link layer 512, a plurality of logical links is established on each D channel. One of these logical links communicates ISDN control signals to each endpoint, and each call control logical link is referred to herein as a logical D channel (LDC). The LDC is identified by a logical D channel number (LDCN).

Link interface 502 does the majority of the functions performed by link layer 512, including the establishment of the logical links. Link management layer 503 identifies the various link interfaces for higher software layers. Further, link management layer 503 communicates information between the logical links and higher software layers.

Network layer 504 processes information communicated on the LDCs and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via PRI link 150, network layer 504 of switching node 101 negotiates with its peer layer (the corresponding network layer 504 in switching node 102) in order to obtain allocation of a B channel in PRI link 150, a procedure later to be repeated if a second B channel is desired. This negotiation is carried out using standard ISDN Q.931 messages such as the call setup and connection messages via the LDC setup on the D channel of PRI link 150. Network layer 504 identifies all B channels of a given interface with the LDC for that interface. Network layer 504 is only concerned with the establishment of a call from one point to another point (e.g., from switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 504 receives information from another node concerning a call via a LDC. As information is received on the LDC, a call reference number is utilized to identify the call associated with this message. The call reference number is selected by the originating network layer during call setup in accordance with the ISDN standard.

Transport layer 505, is the key element that allows the routing of a call through a complex system having multiple nodes as illustrated in FIG. 1. Its primary function is to manage the routing of calls externally, i.e., between switching nodes. Transport layer 505 views the system of FIG. 1 in terms of nodes and is concerned with routing calls from its own node to other nodes or endpoints. (As explained in the detailed discussion of session layer 506, that layer, not transport layer 505, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing layer 3 and signaling paths (LDCs) established between switching nodes.

With respect to inter-node routing, transport layer 505 is the first layer that starts to take a global view of the overall system illustrated in FIG. 1. Transport layer 505 uses information provided by session layer 506 to select the inter-node path. The transport layer performs its task of routing between various nodes by the utilization of tables defining the available paths and the options on those paths. These tables do not define all paths but only those paths which the node has already used.

Communication between transport layers is done by network layer 504 using established LDCs. Transport layer 505 communicates information destined for its peers to network layer 504, and network layer 504 packages this information within the information elements (IEs) of standard ISDN Q.931 messages. Network layer 504 uses the LDC that has been setup to a particular node to communicate this information to its peer network layer. Similarly, when another network layer receives information of this type, the other network layer unpackages information and then directs the information to the transport layer.

The primary function of session layer 506 is to establish communication among endpoints with all endpoints considered to be applications including, for example, a BRI station set is considered an application. Significantly, these endpoints may be applications such as the application performing the call processing features or the dialing plan application. In any event, a connection between such endpoints is considered a call. A session (call) is set up by session layer 506 any time two applications require communication with each other. As noted earlier, session layer 506 deals only in terms of switching nodes and applications on those switching nodes and relies on transport layer 505 to establish paths to other switching nodes. Session layer 506 identifies the called application by an address which previously in the telecommunication art was thought of as only a telephone number but has a much broader concept in the Q.931 protocol. From this address, session layer 506 determines the destination switching node. Session layer 506 sets up a call to the destination switching node by communicating with the session layer of the destination switching node. Communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 507 of FIG. 5 invokes a complex protocol in order to groom the information being communicated between applications so that the applications are totally divorced from the protocol used to communicate the information. A presentation level protocol allows an application to communicate with a peer application across a transport path.

Finally, application layer 508 manages the resources needed by the applications running at software layer 509. When an application at software layer 509 is communicating with another peer application, the application is unaware of how many other applications exist or where these other applications are located. It is the function of application layer 508 to determine and use such details, consequently allowing the applications to be written in a very abstract manner. At applications layer 509, thus far six applications have been discussed: the system management, dialing plan., terminal management, connection manager, directory number management, and call applications.

Figure 6:
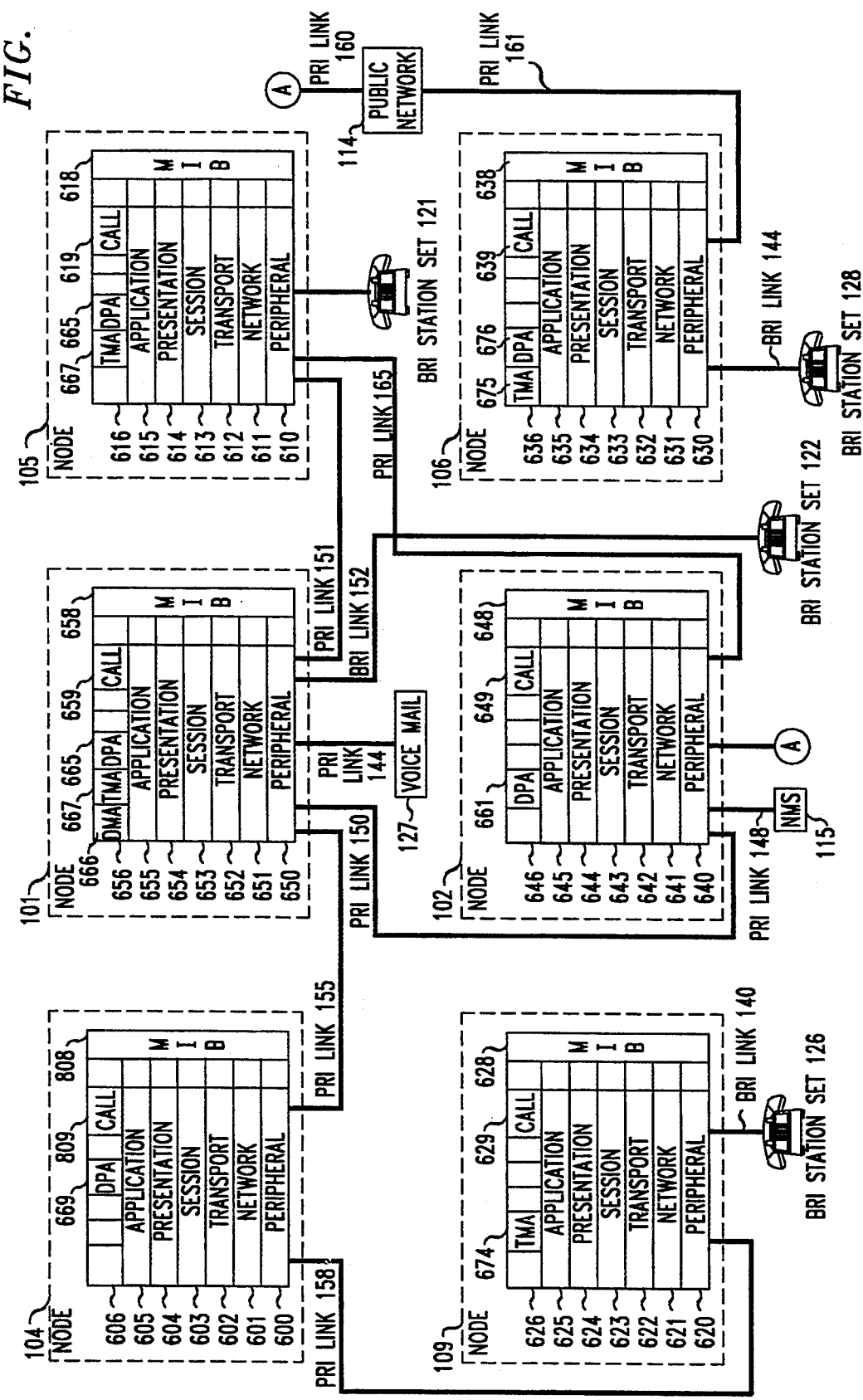
FIG. 6 illustrates in greater detail the telecommunication switching system of FIG. 1.

The manner in which this software architecture is implemented on switching nodes with respect to physical hardware is disclosed in the above-incorporated patent application. FIG. 6 illustrates a software representation of FIG. 1. The elements labeled "peripheral" such as peripheral 640 implement the functions of physical interfaces and networks.

A brief description is given of how a standard ISDN link is initialized with respect to the software layers. During the previous discussion of link interface layer 502 and physical layer 501 of FIG. 5, it was described how these two layers function together to establish logical links on packetized ISDN D or B channels. Link management software layer 503 identifies these logical links and communicates information to or from one of the logical links and any designated higher software layer. The designation of the higher software layer occurs when the logical link is initialized. For example, on a D channel of a standard ISDN link, one specific logical link (referred to as a logical D channel, LDC) is always communicated to network software layer 504 in accordance with the ISDN specification. The LDC communicates all call control information for the B channels of the standard ISDN link and is an integral part of the ISDN specification.

Consider the initialization of a standard ISDN link. When a standard ISDN link becomes active, the physical layer identifies the physical interface number of that link to the link interface software layer. The link interface software layer uses the packet protocol on the D channel to identify what is on the other side of the interface by communicating over a pre-specified logical link of the D channel. The link interface software layer then informs the link management software layer that a new interface is active, that it has a certain number of B channels, and identifies to what the new interface is connected (if possible). The link management software layer informs the network software layer that a new interface is active and that it contains a certain number of B channels.

In response, the network software layer records the new interface's existence and sets up tables to control the B channels. If call control signaling has not previously been established with the other side over a different interface, the network software layer assigns an LDC record to the interface and requests that the link management layer establish a signaling logical link with the other side. This request is passed to the link interface layer which uses the LAP-D protocol to establish signaling. When the signaling logical link is established, the link interface layer notifies the link management layer, which notifies the network software layer that call signaling is active. Finally, the network software layer informs the transport software layer that a new LDC is active and to what system entity the new LDC is connected.

After both sets of software layers (e.g. software layers 550 through 636 and software layers 640 through 646) are initialized in this manner, calls may be established over the B channels associated with the LDC by the network software layers. Signaling information received or transmitted on the LDC is communicated between the network software layer and the link management software layer. In turn, the link management software layer communicates this information with link interface software layer for communication on the logical link of the D channel. For example, PRI links 150 and 148 are established in this manner.

NETWORK MANAGEMENT INITIALIZATION

NMS 115 has a similar software structure as software layers 640 through 646; however, the applications of NMS 115 are different than those in software layer 646. Once the LDC becomes active on PRI link 148, NMS 115 utilizes the system identification information received from switching node 102 to determine that NMS 115 is connected to switching node 102. Then, the system network manager application running in NMS 115 places a call to the system management application running at software layer 646 in switching node 102. The call is directed to the system management application by utilizing the node number of switching node 102 and the specific telephone number which all system management applications share. Once the call is established between the system management application and the system network manager application in NMS 115, the system network manager application requests that the system management application transfer to it from the management information base 648 information relating to physical interfaces connected to switching node 102, switching nodes to which switching node 102 is connected (such as switching node 101), and the connected terminals (such as BRI station set 120). The system network manager application in NMS 115 stores this information in the appropriate tables and analyzes it to determine the switching nodes which are interconnected to switching node 102. The routing tables of switching node 102 are illustrated in FIG. 7, which was populated during the initialization of switching node 102.

As illustrated in FIG. 6, switching node 101 is interconnected to switching node 102 via PRI link 150. NMS 115 places a call via switching node 102 and PRI link 150 to the system manager application in switching node 101. The signaling information required to establish such a call through switching node 102 is transmitted over the LDC established on the D channel of PRI link 148. These signals are commonly called setup messages. The setup message is then processed by layers 640 and 641 to present this setup message to transport layer 642. Transport software layer 642 analyzes the node number utilizing routing table 707, illustrated in FIG. 7. Transport software layer 642 determines that there exists an LDC to switching node 101 and requests that network software layer 641 transmit the setup message to switching node 101. Network software layer 641 then requests that layer 640 transmit the setup message on the established LDC for switching node 101. When the setup message arrives at transport software layer 652 after being processed by the lower software layers, software layer 652 recognizes the node number as its own and utilizes the telephone number in the setup message to establish a session between the system manager application and system network manager application in NMS 115. The session is established by transport software layer 652 requesting that a connection message be transmitted by network software layer 651 back to network software layer 641 of switching node 102. The session being established is a logical call. Once the session has been established between the system network management application of NMS 115 and the system management application, the system network manager application requests that the system management application transfer to it from management information base 658 similar information to that which was requested from the system management application. The routing tables for switching node 101 are illustrated in FIG. 7. The system network manager application in NMS 115 performs similar functions with respect to switching nodes 103 through 112.

DIALING PLANS INITIALIZATION

After the system network manager application has set up a session with each switching node, the dialing plan management application in NMS 115 requests that a session be set up to the dialing plan application of that switching node. The dialing plan management application in NMS 115 first distributes the directory dialing plan to the switching nodes and then distributes the secondary dialing plan to the switching nodes. For example, to distribute the directory dialing plan, the dialing plan management application requests that a session be set up to dialing plan application (DPA) 661 in switching node 102 of FIG. 6. When the session has been set up, the dialing plan management application gives to switching node 102 ownership of all directory telephone numbers of the system as illustrated in FIG. 3. Similarly, the dialing plan management application sets up sessions to each dialing plan application in each of the switching nodes and gives ownership to those nodes of blocks of directory telephone numbers as illustrated in FIG. 3. These sessions are set up by utilizing a setup message which is directed to the appropriate dialing plan application by use of the node number and a predefined telephone number which is common to all dialing plan applications.

A dialing plan application (such as dialing plan application 665 of switching node 101 ) cannot not actually own a block of numbers until it has received permission to do so from the dialing plan application which owns the block. For example, consider the case of dialing plan application 661 of switching node 102, which owns all of the directory telephone numbers, and dialing plan application 665 of switching node 101, which wants to own block "1XXX". Dialing plan application 665 must request ownership of block "1XXX" from dialing plan application 661. Upon giving dialing plan application 665 permission to own that block of directory telephone numbers, dialing plan application 661 makes the entries 705, 701, and 702 on FIG. 7, indicating that these numbers have been given away to switching node 101 and updating the level 5 routing table.

The numbers in the ownership column of tables 708 and 711 of FIG. 7 have the following meaning: "1" means that a number block is owned by the node and received from the node listed in the node column, and "2" means that a number block has been given away to the node listed in the node column. The status column maintains the status of a permission request and whether a call still exits between the two dialing plan applications. A "1" means permission granted, a "2" means permission requested, and a "3" means that a call still exits between the two dialing plan applications.

The remaining switching nodes of FIG. 1 obtain ownership of their portions of the directory telephone number dialing plan as set forth in the above incorporated patent application. The resulting directory dialing plan tables, level 5 routing tables, and level 4 routing tables for each of the switching nodes is set forth in FIGS. 7 and 8.

After the directory dialing plan has been fully initialized, the dialing plan management application distributes the secondary dialing plan to each of the switching nodes as illustrated in FIG. 4. In addition, each switching node is given the node number of the switching node higher in the dialing plan hierarchy than itself. Once again, a dialing plan application cannot actually own a block of numbers until it has received permission to do so from the dialing plan application which owns that block. This function is performed in each node by the same dialing plan application which performed the function for the directory dialing plan. For example, dialing plan application 665 of switching node 101 requests ownership of the block of secondary numbers "S12XX" from dialing plan application 669 of switching node 104. When dialing plan application 669 gives ownership to dialing plan application 665, dialing plan application 669 updates secondary dialing plan table 907 of FIG. 9. Further, dialing plan application 669 also records in level 5 routing table 908 in FIG. 9 the fact that a telephone call to the block of numbers "S12XX" should be routed to switching node 101. The dialing plan applications in the remaining nodes also set up sessions with the correct dialing plan applications to receive ownership of their portions of the secondary dialing plan. The result is illustrated in FIGS. 9 and 10 with the exception of entries 917,918, and 1010 through 1013 which are entered at a later point in time, as will be described.

Finally, the system network manager application in NMS 115 transmits a message to the system manager application in switching node 10 1 to activate directory number manager application (DNM) 666. Further, the system network manager application also informs directory number management application 666 that it is to utilize directory telephone number "1101". Directory number management application 666 requests from dialing plan application 665 permission to utilize this number. Since switching node 101 owns the block of numbers "11XX", dialing plan application 665 gives permission to directory number management application 666 to utilize this number.

Once each node has obtained ownership of its portion of the secondary dialing plan (function 3), the fifth function can be performed (identifying the BRI station sets utilizing the secondary dialing plan to their associated directory number management applications). Note, that the fourth function (initializing and identifying telecommunication terminals using a shared number) was performed during the initialization of the system. At this point in time, the terminal management applications can proceed with the TEI assignment procedure. For example, terminal management application (TMA) 667 is responsive to the terminal service profile information to ascertain that BRI station set 122 is sharing directory number 1101 and that it is utilizing secondary number "S1102".

First, terminal management application 667 requests that dialing plan application 665 obtain permission to use secondary number "S1102". Dialing plan application 665 requests that a session be set up with the dialing plan application owning "S1102". In response to this request, session layer 653 examines level 5 routing table 1002 of FIG. 10 and determines that it has no information on how to route to the switching node owning secondary number "S1102". (Note that entries 1011 through 1013 have not been entered into table 1002 at this time) As a default, session software layers 653 routes the request for a session to switching node 104, which is higher in the secondary dialing plan hierarchy than switching node 101 as illustrated in FIG. 4. Session software layer 553 requests that transport software layer 652 attempt to set up a session with the dialing plan application owning secondary number "S1102" via switching node 104. Transport layer 652 is responsive to the request from session layer 653 to route a call to switching node 104 by examining level 4 routing table 1003 to determine that PRI link 155 is to be utilized. Transport layer 652 requests that network layer 65 1 transmit a set up message to establish a call with dialing plan application 669 in switching node 104.

Once the session is established, dialing plan 665 requests that dialing plan 669 give permission for dialing plan application 665 to own/host the secondary number "S1102". Dialing plan application 669 in switching node 104 is responsive to this request to interrogate secondary dialing plan table 907 of FIG. 9. From this table, dialing plan application 669 determines that the secondary number "S1102" is part of a block, "S11XX", whose ownership has been given to switching node 105. In response to this determination, dialing plan application 669 requests that call application 609 redirect the call to switching node 105. In response to this request, network layer 601 transmits back to switching node 101 a redirect message specifying that the call/session is to be directed to switching node 105. The operation of the redirect message is set forth in the above incorporated patent application.

Transport layer 652 of switching node 101 is responsive to the redirect message to interrogate level 4 routing table 1003 of FIG. 10 to determine that PRI link 151 is to be utilized to reach switching node 105. Transport layer 652 requests that the set up message be sent to switching node 105 by network layer 651. When the set up message is received at switching node 105, it is communicated to layers 610 through 615 to dialing plan application 673. After a session has been set up between dialing plan applications 665 and 673, dialing plan application 665 requests permission to host secondary number "S1102". Dialing plan application 673 transmits back permission to dialing plan application 665 and marks tables 904 and 905 of FIG. 9 appropriately. In secondary dialing plan table 904, dialing plan application 673 inserts entry 915, which designates that secondary number "S1102" is being hosted by switching node 101. Entry 916 in level 5 routing table 905 for switching node 105 designates that the secondary number "S1102" can be reached by routing to switching node 101.

Upon receiving permission to host the secondary number, dialing plan application 665 updates secondary dialing plan table 1001 of FIG. 10 with entry 1010 to indicate that it now owns secondary number "S1102" and has received permission to host this number from switching node 105. Also, dialing plan application 665 updates level 5 routing table 1002 to indicate that secondary number "S1102" terminates on switching node 101.

Dialing plan application 665 then informs terminal management application 667 of the fact that switching node 101 is now hosting secondary number "S1102". Terminal management application 667 then informs directory number management application 666 that secondary number "S1102" is sharing directory number "1101". In response, directory number management application 666 makes entry 1105 into directory number management table 1101 of FIG. 11. Note directory number management application 666 can perform necessary operations on a number of directory numbers and their associated secondary numbers and utilizes the entries in FIG. 11 to properly associate the secondary numbers with their directory numbers.

Terminal management application 672 and dialing plan application 673 of switching node 105 perform similar operations with respect to BRI station set 121 which is utilizing secondary number "S1101". The resulting of these operations is the insertion of entry 1106 into FIG. 11. Note that switching node 105 owns the secondary number block "S11XX", hence dialing plan application 673 does not have to get permission to use secondary number "S1101".

Consider how the fifth function (identifying the BRI station sets utilizing the secondary dialing plan to their associated directory management applications) is performed with respect to BRI station set 128. Terminal management application 675 of switching node 106 is responsive to the initialization of BRI station set 128 to request that dialing plan application 676 request permission to host secondary number "S1103". Dialing plan application 676 requests that session layer 633 route to the dialing plan application which owns "S1103". Session software layer 633 has no information as to which dialing plan application owns secondary number "S1103" and routes to the switching node higher in the secondary dialing plan hierarchy as illustrated in FIG. 4. Dialing plan application 676 requests that a session be set up with dialing plan application 661 on switching node 102. This session can be easily set up since level 4 routing table 912 for node 106 of FIG. 9 has an entry defining how to communicate with switching node 102.

Figure 12:
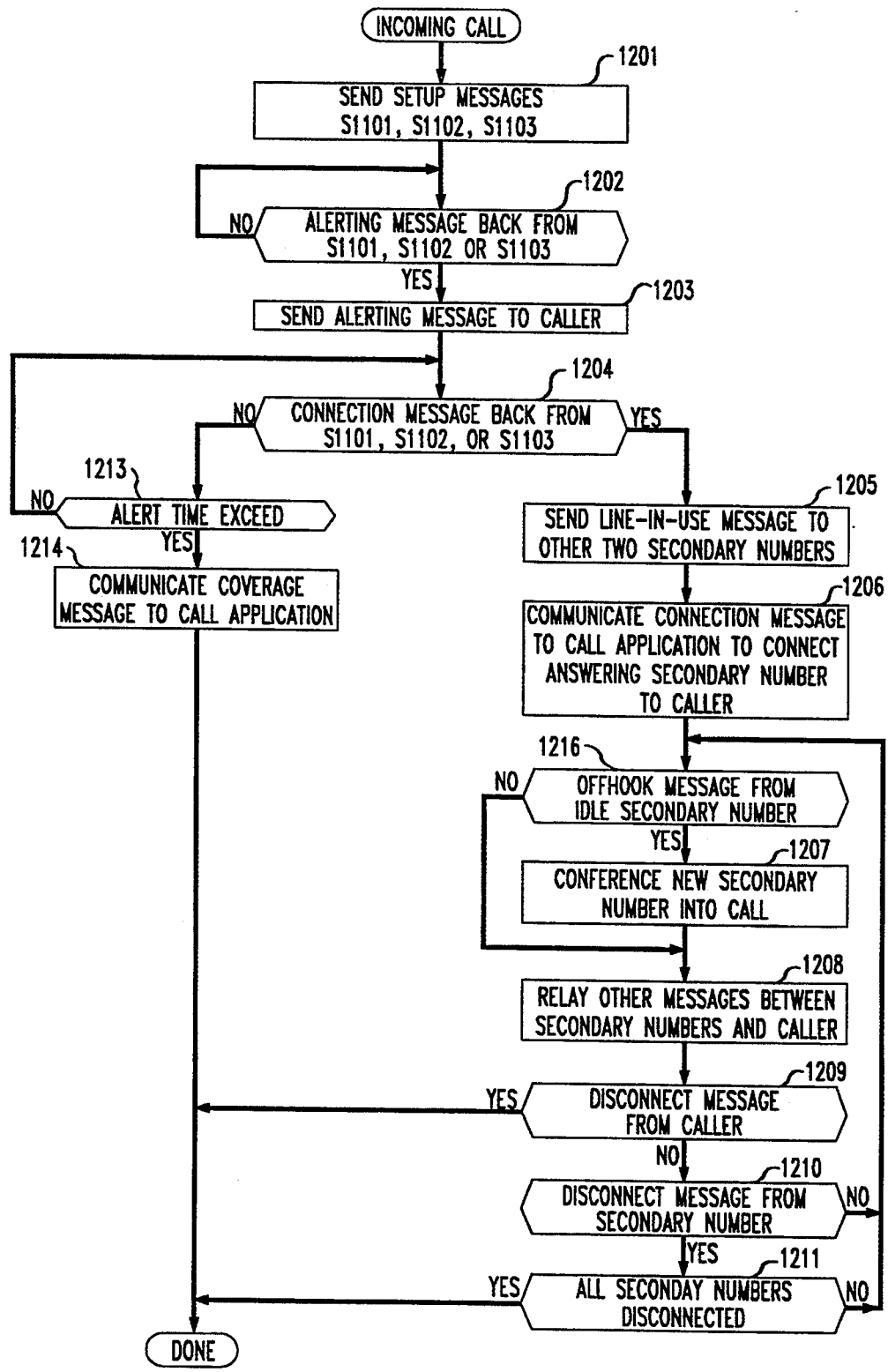

Once the session has been set up between dialing plan application 676 of switching node 106 and dialing plan application 661 of switching node 102, dialing plan application 676 requests permission to host secondary number "S1103". Dialing plan application 661 examines secondary dialing plan table 901 and determines that it has given ownership of the block of secondary numbers "S1XXX" to switching node 104 and requests that the lower software layers redirect the session to dialing plan application 669 of switching node 104. Dialing plan application 669 is responsive to the session being set up to examine secondary dialing plan table 907 of FIG. 9 and determined that the block of numbers "S11XX" has been given to switching node 105. Dialing plan application 669 then, through the use of a redirect message, causes switching nodes 104 and 101 to redirect the call to dialing plan application 673 of switching node 105. Once a session has been set up between dialing plan application 676 of switching node 106 and dialing plan application 673 of switching node 105, dialing plan application 676 obtains permission to host secondary number "S1103" from dialing plan application 673. Both dialing plan applications update the secondary tables dealing with the dialing plan, level 5 routing, and level 4 routing for their respective switching nodes. These updated tables are illustrated in FIG. 12.

After dialing plan application 676 of switching node 106 has received permission to host the secondary number, terminal management application 675 of switching node 106 proceeds with identifying BRI station set 128 to directory number management application 666 of switching node 101. Terminal management application 675 requests that a message be sent to directory number management application 666 informing it of the existence of BRI station set 128. This message is routed to directory number management application 666 utilizing the directory dialing plan. Terminal management application 675 requests that session software layer 633 route the message to directory number 1101, which identifies directory number management application 666. Session software layer 633 accesses level 5 routing table 802 of FIG. 8 and determines that the message should be routed to switching node 101. Transport software layer 632 is responsive to a request to route to switching node 101 to transmit the message via PRI link 661. The messages then are routed through switching node 102 to directory number management application 666 on switching node 101. Directory number management application 666 is responsive to this message to update directory number management table 1101 by inserting 1103 into this table.

Consider now how a call is set up between BRI station set 126, which is connected to switching node 109, and BRI station sets 121, 122, and 128, which share directory number "1101". A call is routed from BRI station set 126, which is connected to switching node 109, to BRI station sets 121, 122, and 128 using the shared directory number "1101". Terminal management application 674 in switching node 109 is responsive to the set up request and dialed number (also referred to as the called number) from BRI station set 126 to request that a call be set up to the dialed number which is "1101". Session layer 623 is responsive to this request to examine level 5 routing table 1005 of FIG. 10. Session software layer 623 accesses level 5 routing table 1005 and determines that it does not know how to route the call. As a default action, session software layer 623 decides to route the call to the switching node that has the dialing plan manager for the number "nearest" the dialed number, in this case, switching node 104. Session software layer 623 then transmits down to transport software layer 622 a request to route a set up message to switching node 104.

Transport software layer 622 is responsive to this request to access level 4 routing table 1005 illustrated in FIG. 10 and to determine from this table that the LDC of PRI link 158 is to be used to access switching node 104. Transport software layer 622 then sends a request to network software layer 621 to transmit a set up message to switching node 104. A set up message includes the destination switching node number, the dialed number, and the telephone number of the caller. Network software layer 621 in conjunction with peripheral 620 transmits the set up message via PRI link 158 to switching node 104.

When the set up message is received by peripheral 600, it is transferred to software layer 602 via network software layer 601. Transport software layer 602 recognizes the node number for switching node 104 and transfers the setup message to session software layer 603. Session software layer 603 accesses level 5 routing table 908 of FIG. 9 to match the dialed number with one of the telephone numbers entered in that table. The only telephone number that matches the dialed number is entry 917 which identifies switching node 101. Session software layer 603 then requests that transport software layer 602 transmit the setup message to switching node 101 and include the dialed telephone number and the caller telephone number.

Transport software layer 602 accesses level 4 routing table 909 of switching node 104 to find a path to switching node 101. Transport software layer 602 matches at entry 918 and determines that the route to switching node 101 is via PRI link 155. The latter software layer then formulates a request to network software layer 601 to transmit the setup message to switching node 101. Network software layer 601 transmits the setup message via PRI link 155 to switching node 101.

When the setup message is received by transport layer 652 via peripheral 650 and network software layer 651 of switching node 101, this transport software layer examines the destination switching node number and determines that it is its own. Transport software layer 652 then communicates the setup message to session layer 653. The latter software layer is responsive to the dialed number to access level 5 routing table 1002 of FIG. 10. The dialed number matches entry 1011 of FIG. 10. This entry destinates that the number can be found on switching node 101. Using other internal tables, session software layer 653 determines that this dialed number references directory number management application 666 and communicates the setup message to directory number management application 666.

Directory number management application 666 is responsive to the setup message to request that session layer 653 send setup messages to BRI station sets 121, 122, and 128 utilizing secondary numbers "S1101", "S1102", and "S1103", respectively. The setup messages include the caller information received in the setup message from BRI station set 126 and switching node 109. For BRI station set 122, session layer 653 is responsive to the request to access level 5 routing table 1002. Since the number is a secondary number, table 1002 is accessed rather than level 5 routing table 709 of FIG. 7. Upon accessing level 5 routing table 1002, session software layer 653 determines that the secondary number "S1102" terminates on switching node 101 and transfers the setup message to terminal management application 667. Terminal management application 667 then alerts BRI station set 122 via software layers 653 through 655. Once BRI station set 122 is alerted, BRI station set 122 responds with an alerting message, which is transferred back to directory number management application 666 via software layers 650 through 655.

With respect to the request to send a setup message to BRI station set 121, session software layer 653 is responsive to the request from directory number management application 666 to examine level 5 routing table 1002 of FIG. 10 and determines that the best match for secondary number "S1101" is entry 1012, which designates that this secondary number is part of a block of secondary numbers owned by switching node 104. In response to this determination, session software layer 653 requests that transport software layer 652 communicate the setup message to switching node 104.

In response to this request, transport software layer 652 accesses level 4 routing table 1003 and determines that the LDC to be used for routing calls to switching node 104 is that of PRI link 155. Transport software layer 652 then requests that layers 650 and 651 route the setup message to switching node 104 via PRI link 155.

When the setup message is routed to session software layer 613 of switching node 105 via layers 610 through 612, session software layer 613 accesses level 5 routing table 905 of FIG. 9 and determines that the secondary number "S1101" is part of a block which has been given to switching node 105. Session layer 653 then requests that transport layer transmit back to switching node 101 a redirect message redirecting a setup message to switching node 105. Transport layer 652 of switching node 101 is responsive to the redirected setup message to route this message to switching node 105 via PRI link 151 after accessing level 4 routing table 1003 of FIG. 10, which defines that PRI link 151 is to be utilized to route calls to switching node 105.

Upon receiving the setup message, transport layer 612 of switching node 105 determines that the destination switching node is switching node 105 and communicates the setup message to session layer 613. Session layer 613 is responsive to the setup message to communicate this setup message to terminal management application 652. In turn, terminal management application 672 transmits the setup message to BRI station set 121. BRI station set 121 responds with an alerting message which terminal management application 672 requests be sent back to directory number management application 666 on switching node 101.

With respect to the request to send a setup message to BRI station set 128, session software layer 653 is responsive to the request from directory number management application 666 to examine level 5 routing table 1002 of FIG. 10 and determines that the best match for secondary number "S1101" is entry 1012, which designates that this secondary number is part of a block of secondary numbers owned by switching node 104. In response to this determination, session software layer 653 requests that transport software layer 652 communicate the setup message to switching node 104.

In response to this request, transport software layer 652 accesses level 4 routing table 1003 and determines that the LDC to be used for routing calls to switching node 104 is that of PRI link 155. Transport software layer 652 then requests that layers 650 and 651 route the setup message to switching node 104 via PRI link 155.

When the setup message is routed to session software layer 613 of switching node 105 via layers 610 through 612, session software layer 613 accesses level 5 routing table 905 of FIG. 9 and determines that the secondary number "S1103" is being hosted by switching node 106. Session layer 653 then requests that transport layer 25 transmit back to switching node 101 a redirect message redirecting a setup message to switching node 106. Transport layer 652 of switching node 101 is responsive to the redirected setup message to route this message to switching node 106 via PRI link 150 after accessing level 4 routing table 1003 of FIG. 10, which defines that PRI link 150 is to be utilized to route calls to switching node 105. Transport layer 642 of switching node 102 is responsive to the setup message from switching node 101 for switching node 106 to route that message via PRI link 160.

Upon receiving the setup message, transport layer 632 of switching node 106 determines that the destination switching node is switching node 106 and communicates the setup message to session layer 633. Session layer 633 is responsive to the setup message to communicate this setup message to terminal management application 675. In turn, terminal management application 675 transmits the setup message to BRI station set 128. BRI station set 128 responds with an alerting message which terminal management application 675 requests be sent back to directory number management application 666 on switching node 101.

Once directory number management application 666 has received the alerting message from either BRI station set 122 or BRI station set 121, directory number management application 666 communicates an alerting message back to switching node 109.

Assume now for the sake of the example that BRI station sets 122 and 128 do not answer the telephone call from BRI station set 126 but that BRI station set 121 does answer. When BRI station set 121 answers the call, switching node 105 transmits a connecting message to switching node 101 and sets up a connection between BRI link 136 and PRI link 159 via peripheral 610 of FIG. 6. When the connection message is received by switching node 101, it will be communicated to directory number management application 666. The latter application responds by setting up a connection through switching node 101 between PRI link 151 and PRI link 155 and transmitting a connection message to switching node 109 via switching node 104. This connection message causes connections to be set up through switching nodes 104 and 109. Switching node 109 responds with a connection acknowledge message which is relayed back to directory number management application 666. At this time, there is a talk path between BRI station 121 and BRI station set 126.

In response to the connection acknowledge message, directory number management application 666 transmits a connection acknowledge message to switching node 105 for BRI station set 121. In addition, directory number management application 666 communicates to terminal management application 667 a message which results in the line-in-use indication lamp associated with the shared directory number being activated on BRI station set 122. The directory number management application also requests that a line-in-use message be sent to terminal management application 675 on switching node 106. If a person should select the line associated with the shared directory number and go off-hook on BRI station set 122, terminal management application 667 would communicate a connection message to directory number management application 666 requesting that a connection be set up through peripheral 610 between BRI station set 122 and switching node 105 (terminal management 675 could perform a similar operation on switching node 106). Directory number management application 666 would be responsive to this connection message to establish a conference which would join BRI station set 122 into the call already set up between BRI station set 126 and BRI station set 121.

When switching node 105 transmitted the alerting message back to switching node 101, it includes information concerning the secondary numbers owned by switching node 105. Session layer 653 of switching node 101 is responsive to this information to insert entry 1113 into level 5 routing table 1002 of FIG. 10. Entry 1113 designates that switch rag node 105 owns the secondary number block of "S11XX".

Consider now the operation of the system illustrated in FIG. 1 when BRI station set 121 originates a call on the shared line associated with directory number management application 666 of switching node 101 as illustrated in FIG. 6. For the sake of this example, it is assumed that BRI station set 126 is using directory number "2001". BRI station set 121 goes off hook and dials the directory number for BRI station set 126 which is "2001". Terminal management application 672 of FIG. 6 is responsive to the actions of BRI station set 121 to form a setup message which is communicated to directory number management application 666 of FIG. 6. Also, included in the setup message is the caller ID information, which is secondary number "S1101", and the ultimate directory number destination which is "2001". Terminal management application 672 requests that session software layer 613 transmit this message to directory number "1101", which is the directory number identifying directory number management application 666. Session software layer 613 accesses level 5 muting table 805 of FIG. 8 and determines that the call should be routed to switching node 101. Session software layer 613 then transmits a request to transport software layer 612 for the setup message to be communicated to switching node 101. Transport software layer 612 is responsive to this request to access level 4 routing table 806 of FIG. 8 and to determine that messages are communicated to switching node 101 via PRI link 151. Network software layer 611 and peripheral 610 are responsive to the information from transport software layer 612 to transmit the setup message to switching node 101 via PRI link 151.

Transport software layer 652 of switching node 101 is responsive to the setup message received via layers 651 and 650 to determine that the destination switching node is 101 and to transfer the setup message to session software layer 653. The latter software layer determines that the directory number "1101" is terminated on directory number management application 666, and the setup message is communicated to directory number management application 666. Directory number management application 666 is responsive to the setup message to communicate the fact that BRI station set 121 has gone off hook to terminal management application 667, which transmits a message to BRI station set 122 via BRI link 152. BRI station set 122 actuates its line-in-use indicator. This message is routed to BRI station set 122 on the basis of the secondary number "S1102", which identifies BRI station set 122. A similar operation is performed with respect to BRI station set 128 and terminal management application 675.

Then, directory number management application 666 forms a new setup message which is directed to BRI station set 126 utilizing that station set's directory number, "2001". Directory number management application 666 inserts its own directory number, "1101", into the setup message. Terminal management application 667 then requests that layers 650 through 653 of switching node 101 communicate the setup message to BRI station set 126. Session software layer 653 accesses level 5 routing table 709 of FIG. 7 and determines that the call must be routed to 102, which is the only entry that matches the dialed telephone number, and requests that transport software layer 652 route the setup message to switching node 102.

When session software layer 643 of switching node 102 receives the setup message it determines from level 5 routing table 706 of FIG. 7 that the setup message should be routed to switching node 104, which owns the block of directory numbers "2XXX". Transport software layer 652 is responsive to this information to transmit the setup message back to switching node 101 as a redirect message specifying that the message should be transmitted to switching node 104.

After the setup message is received by session software layer 603 of switching node 104, this software layer accesses level 5 routing table 713 of FIG. 7 and determines that the setup message should be routed to switching node 109. Transport software layer 602 is responsive to this information from transport software layer 603 to access level 4 routing table 712 of FIG. 7 to determine that the setup message should be routed to switching node 109 via PRI link 158.

When the setup message is received by session software layer 623 of switching node 109, this software layer determines that the directory number is terminated on switching node 109 and transfers the setup message to terminal management application 674, which alerts BRI station set 126.

The normal flow of ISDN messages now are generated between switching node 109 and directory number management application 666 of switching node 101 utilizing the directory number dialing plan, and the normal flow of messages are communicated between directory number management application 666 and switching node 105 utilizing the secondary dialing plan as was previously described in the reverse direction in the example of BRI station set 126 placing a call to BRI station set 121.

FIG. 12 illustrates, in flow chart form, the operations performed by directory number management application 666 of FIG. 6 in response to an incoming call. In response to a setup message defining an incoming call, DNM 666 transmits setup messages to BRI station sets 121,122, and 128 using the secondary dialing plan by execution of block 1201. Decision block 1202 waits until an alerting message is received back from anyone of the BRI station sets and then, transfers control to block 1203, which sends an alerting message back to the caller. Block 1203 transfers the control to decision block 1204. The latter decision block checks to see if a connection message has been received back from BRI station sets 121,122 or 128. If a connection message has not been received back, decision block 1213 is executed to determine if the amount of time allowed for alerting has been exceeded. If this amount of time has been exceeded, block 1214 is executed. The latter block transmits a coverage message to call application 659 of switching node 101. This coverage message results in the incoming call being transferred to voice mail system 127. If the alerting time has not been exceeded, control is transferred back to decision block 1204.

Once a connection message is received by decision block 1204, block 1205 sends line-in-use messages to the other two BRI station sets, and block 1206 causes the calling party to be connected to the answering BRI station set via a message to the call application which in the present example would be call application 659.

After the calling party and the answering BRI station set have been connected, blocks 1216 and 1207 through 1211 are executed to relay messages between the BRI station sets and the calling party, to determine if one of the idle BRI station sets has gone off hook, to conference that off hook BRI station set into the call, and to determine when the call is abandoned by checking for disconnect messages from the caller and the BRI station sets through the execution of blocks 1209 through 1211.

FIG. 13 illustrates, in flow chart form, the operations performed by a directory number management application in response to an outgoing call from one of the BRI station sets on the shared line appearance. FIG. 13 utilizes the fact that in the present example the shared line appearance station sets are BRI station sets 121, 122, and 128; however, one skilled in the art could easily generalize the operations illustrated in FIG. 13 to other BRI station sets. Recall that BRI station set 121 (secondary number "S1101") has exclusion preference. Exclusion preference means that if an outgoing call is placed by BRI station set 121, the other two BRI station sets cannot be added into that outgoing call. Decision block 1301 determines whether or not the setup message from one of the calling line appearance station sets is from BRI station set 121. If the answer is yes, control is transferred to block 1302, which transmits line-in-use messages to BRI station sets 122 and 128. Next, block 1303 transmits a setup message to the destination telephone terminal designated in the setup message from BRI station set 121. Block 1304 relays messages back and forth between the destination telephone terminal and BRI station set 121. Block 1305 blocks BRI station sets 122 and 128 from being added to the outgoing call. Decision block 1306 checks to see if either BRI station set 121 or the destination telephone terminal has transmitted a disconnect message. If the answer is no, control is transferred to block 1302. However, if the answer is yes, the outgoing call is terminated.

Returning to decision block 1301, which checks for a setup message, if the answer is no, this means that the setup message is from BRI station set 122 or 128 in the present example. Block 1308 is executed to send line-in-use messages to the remaining two shared line appearance station sets, and block 1309 establishes a call between the originating line appearance station set and the destination telephone terminal. Blocks 1310 through 1315 perform the following functions: (1) Blocks 1310 and 1311 check to see if one of the remaining shared line appearance station sets has gone off hook in which case the off hook station set is added into the outgoing call, (2) Block 1312 relays messages between the shared line appearance station sets which are on the outgoing call and the destination telephone terminal, (3) Blocks 1313 through 1315 determine when the outgoing call is terminated, which occurs when the destination telephone terminal or the last shared line appearance station set sends a disconnect message.

We claim:

1. A method for providing a shared line appearance to a plurality of telephone station sets, the method comprising the steps of:

controlling, by a directory number management application, incoming calls directed to the shared line appearance using a shared directory number of a directory dialing plan, and transferring, by the directory number management application, first call information from a calling telephone station set to each of the plurality of telephone stations sets, each terminating the shared line appearance and each connected to a different one of a plurality of switching nodes, by using a secondary number of a secondary dialing plan assigned to each of the telephone station sets to route through the switching nodes.

2. The method of claim 1 wherein the directory number management application executes on one of the switching nodes.

3. The method of claim 2 wherein the step of controlling the incoming call comprises the steps of receiving the first call information indicative of call setup from the calling telephone station set by the directory number management application;

transmitting, by the directory number management application, second call information indicative of alerting to the calling telephone station set in response to the first call information using the shared directory number as a destination directory number; and transmitting first control information indicative of call setup, which is generated by the directory number management application, to the ones of the plurality of telephone station sets in response to the first call information received from the calling telephone station set.

4. The method of claim 3 wherein the step of controlling the incoming call further comprises the step of transmitting second control information indicative of call connection to the directory number management application by one of the plurality of telephone station sets in response to a user of the one of the plurality of telephone station sets answering the incoming call;

transmitting third call information indicative of connection to the calling telephone station set by the directory number management application in response to the second control information; and transmitting third control information indicative of call answer to the remaining ones of the plurality of telephone station sets by the directory number management application further in response to the second control information.

5. The method of claim 4 wherein the step of controlling the incoming call further comprises the steps of transmitting fourth control information indicative of call connection to the directory number management application by another one of the plurality of telephone station sets in response to a user of other one of the plurality of telephone station sets requesting to join the incoming call; and transmitting fourth call information indicative of conferencing to the one of the switching nodes executing the directory number management application by the directory number management application whereby the one of the switching nodes executing the directory number management application conferences the other one of the plurality of telephone station sets into the incoming call.

6. The method of claim 2 further comprises the steps of controlling, by the directory number management application, an outgoing call to a called telephone station set from one of the plurality of telephone station sets; and transmitting, by the directory number management application, first control information concerning the outgoing call to the other ones of the plurality of telephone station sets using the secondary number assigned to each of the other ones of the plurality of telephone station sets to route the first control information concerning the outgoing call through the switching nodes to the switching node to which each of the other ones of the plurality of telephone station sets is connected.

7. The method of claim 6 wherein the step of controlling the outgoing call comprises the steps of placing the outgoing call for the called telephone station set to the directory number management application using the shared directory number, via the one of switching nodes executing the directory number management application, by the one of the plurality of telephone station sets; and re-placing the outgoing call to the called telephone station set using a directory number of the called telephone station set by the directory number management application using the shared directory number as the originating directory number.

8. The method of claim 7 wherein the step of controlling the outgoing call further comprises the steps of transmitting second control information indicative of a call connection request to the directory number management application by another one of the plurality of telephone station sets in response to a user of the other one of the plurality of telephone station sets requesting to join the outgoing call;

conferencing the other one of the plurality of telephone stations sets into the outgoing call by the directory number management application in response to the second control information.

9. The method of claim 1 wherein the plurality of switching nodes are interconnected by the public telephone network.

10. The method of claim 9 wherein the directory number management application executes on one of the switching nodes.

11. The method of claim 10 wherein the step of controlling the incoming call comprises the steps of receiving the first call information indicative of call setup from the calling telephone station set by the directory number management application;

transmitting, by the directory number management application, second call information indicative of alerting to the calling telephone station set in response to the first call information using the shared directory number as a destination directory number; and transmitting first control information indicative of call setup, which is generated by the directory number management application, to the ones of the plurality of telephone station sets in response to the first call information received from the calling telephone station set.

12. The method of claim 11 wherein the step of controlling the incoming call further comprises the step of transmitting second control information indicative of call connection to the directory number management application by one of the plurality of telephone station sets in response to a user of the one of the plurality of telephone station sets answering the incoming call;

transmitting third call information indicative of connection to the calling telephone station set by the directory number management application in response to the second control information; and transmitting third control information indicative of call answer to the remaining ones of the plurality of telephone station sets by the directory number management application further in response to the second control information.

13. The method of claim 12 wherein the step of controlling the incoming call further comprises the steps of transmitting fourth control information indicative of call connection to the directory number management application by another one of the plurality of telephone station sets in response to a user of other one of the plurality of telephone station sets requesting to join the incoming call; and transmitting fourth call information indicative of conferencing to the one of the switching nodes executing the directory number management application by the directory number management application whereby the one of the switching nodes executing the directory number management application conferences the other one of the plurality of telephone station sets into the incoming call.

14. The method of claim 10 further comprises the steps of controlling, by the directory number management application, an outgoing call to a called telephone station set from one of the plurality of telephone station sets; and transmitting, by the directory number management application, first control information concerning the outgoing call to the other ones of the plurality of telephone station sets using the secondary number assigned to each of the other ones of the plurality of telephone station sets to route the first control information concerning the outgoing call through the switching nodes to the switching node to which each of the other ones of the plurality of telephone station sets is connected.

15. The method of claim 14 wherein the step of controlling the outgoing call comprises the steps of placing the outgoing call for the called telephone station set to the directory number management application using the shared directory number, via the one of switching nodes executing the directory number management application, by the one of the plurality of telephone station sets; and re-placing the outgoing call to the called telephone station set using a directory number of the called telephone station set by the directory number management application using the shared directory number as the originating directory number.

16. The method of claim 15 wherein the step of controlling the outgoing call further comprises the steps of transmitting second control information indicative of a call connection request to the directory number management application by another one of the plurality of telephone station sets in response to a user of the other one of the plurality of telephone station sets requesting to join the outgoing call;

conferencing the other one of the plurality of telephone stations sets into the outgoing call by the directory number management application in response to the second control information.

17. An apparatus for providing a shared line appearance to a plurality of telephone station sets, the apparatus comprising:

each telephone station set terminating the shared line appearance and each connected to a different one of a plurality of switching nodes with the shared line appearance being identified by a shared directory number of a directory dialing plan means, in a directory number management application, for controlling incoming calls directed to the shared line appearance using the shared directory number; and means, in the directory number management application, for transferring first call information from a calling telephone station set to each of the plurality of telephone station sets by using a secondary number of a secondary dialing plan assigned to each of the telephone station sets to route through the switching nodes.

18. The apparatus of claim 17 wherein the directory number management application executes on one of the switching nodes.

19. The apparatus of claim 18 wherein means for controlling the incoming call comprises means, in the directory number management application, for receiving the first call information indicative of call setup from the calling telephone station set;

means, in the directory number management application, for transmitting second call information indicative of alerting to the calling telephone station set in response to the first call information using the shared directory number as a destination directory number; and means, in the directory number management application, for transmitting first control information indicative of call setup, which is generated by the directory number management application, to the ones of the plurality of telephone station sets in response to the first call information received from the calling telephone station set.

20. The apparatus of claim 19 wherein means for controlling the incoming call further comprises means for transmitting second control information indicative of call connection to the directory number management application, by one of the plurality of telephone station sets in response to a user of the one of the plurality of telephone station sets answering the incoming call;

means, in the directory number management application, for transmitting third call information indicative of connection to the calling telephone station set in response to the second control information; and means, in the directory number management application, for transmitting a third control information indicative of call answer to the remaining ones of the plurality of telephone station sets further in response to the second control information.

21. The apparatus of claim 20 wherein means for controlling the incoming call further comprises means for transmitting fourth control information indicative of call connection to the directory number management application by another one of the plurality of telephone station sets in response to a user of the other one of the plurality of telephone station sets requesting to join the incoming call; and means, in the directory number management application, for transmitting fourth call information indicative of conferencing to the one of the switching nodes executing the directory number management application whereby the one of the switching nodes executing the directory number management application conferences the other one of the plurality of telephone station sets into the incoming call.

22. The apparatus of claim 18 further comprises means, in the directory number management application, for controlling an outgoing call to a called telephone station set from one of the plurality of telephone station sets; and means, in the directory number management application, for transmitting first control information concerning the outgoing call to the other ones of the plurality of telephone station sets using the secondary number assigned to each of the other ones of the plurality of telephone station sets to route the first control information concerning the outgoing call through the switching nodes to the switching node to which each of the other ones of the plurality of telephone station sets is connected.

23. The apparatus of claim 22 wherein means for controlling the outgoing call comprises means for placing the outgoing call for the called telephone station set to the directory number management application using the shared directory number via the one of switching nodes executing the directory number management application by the one of the plurality of telephone station sets; and means, in the directory number management application, for re-placing the outgoing call to the called telephone station set using a directory number of the called telephone station set using the shared directory number as the originating directory number.

24. The apparatus of claim 23 wherein means for controlling the outgoing call further comprises means for transmitting second control information indicative of a call connection request to the directory number management application by another one of the plurality of telephone station sets in response to a user of the other one of the plurality of telephone station sets requesting to join the outgoing call; and means, in the directory number management application, for conferencing the other one of the plurality of telephone station sets into the outgoing call.

25. The apparatus of claim 18 wherein the plurality of switching nodes are interconnected by the public telephone network.

26. The apparatus of claim 25 wherein means for controlling the incoming call comprises means, in the directory number management application, for receiving the first call information indicative of call setup from the calling telephone station set;

means, in the directory number management application, for transmitting second call information indicative of alerting to the calling telephone station set in response to the first call information using the shared directory number as a destination directory number; and means, in the directory number management application, for transmitting first control information indicative of call setup, which is generated by the directory number management application, to the ones of the plurality of telephone station sets in response to the first call information received from the calling telephone station set.

27. The apparatus of claim 26 wherein means for controlling the incoming call further comprises means for transmitting second control information indicative of call connection to the directory number management application, by one of the plurality of telephone station sets in response to a user of the one of the plurality of telephone station sets answering the incoming call;

means, in the directory number management application, for transmitting third call information indicative of connection to the calling telephone station set in response to the second control information; and means, in the directory number management application, for transmitting a third control information indicative of call answer to the remaining ones of the plurality of telephone station sets further in response to the second control information.

28. The apparatus of claim 27 wherein means for controlling the incoming call further comprises means for transmitting fourth control information indicative of call connection to the directory number management application by another one of the plurality of telephone station sets in response to a user of the other one of the plurality of telephone station sets requesting to join the incoming call; and means, in the directory number management application, for transmitting fourth call information indicative of conferencing to the one of the switching nodes executing the directory number management application whereby the one of the switching nodes executing the directory number management application conferences the other one of the plurality of telephone station sets into the incoming call.

29. The apparatus of claim 25 further comprises means, in the directory number management application, for controlling an outgoing call to a called telephone station set from one of the plurality of telephone station sets; and means, in the directory number management application, for transmitting first control information concerning the outgoing call to the other ones of the plurality of telephone station sets using the secondary number assigned to each of the other ones of the plurality of telephone station sets to route the first control information concerning the outgoing call through the switching nodes to the switching node to which each of the other ones of the plurality of telephone station sets is connected.

30. The apparatus of claim 29 wherein means for controlling the outgoing call comprises means for placing the outgoing call for the called telephone station set to the directory number management application using the shared directory number via the one of switching nodes executing the directory number management application by the one of the plurality of telephone station sets; and means, in the directory number management application, for re-placing the outgoing call to the called telephone station set using a directory number of the called telephone station set using the shared directory number as the originating directory number.

31. The apparatus of claim 30 wherein means for controlling the outgoing call further comprises means for transmitting second control information indicative of a call connection request to the directory number management application by another one of the plurality of telephone station sets in response to a user of the other one of the plurality of telephone station sets requesting to join the outgoing call; and means, in the directory number management application, for conferencing the other one of the plurality of telephone station sets into the outgoing call.

* * * * *